March 24, 1925.  
W. J. BROWN  
INTERNAL COMBUSTION ENGINE  
Filed Jan. 7, 1922  
1,531,069  
2 Sheets-Sheet 2
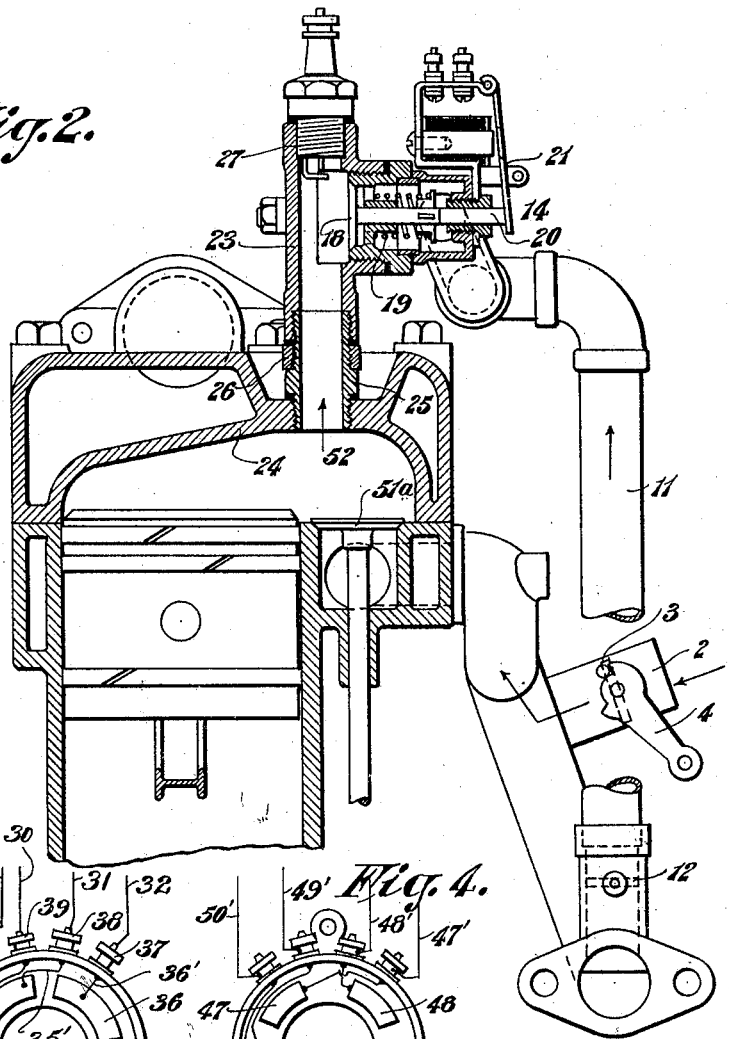

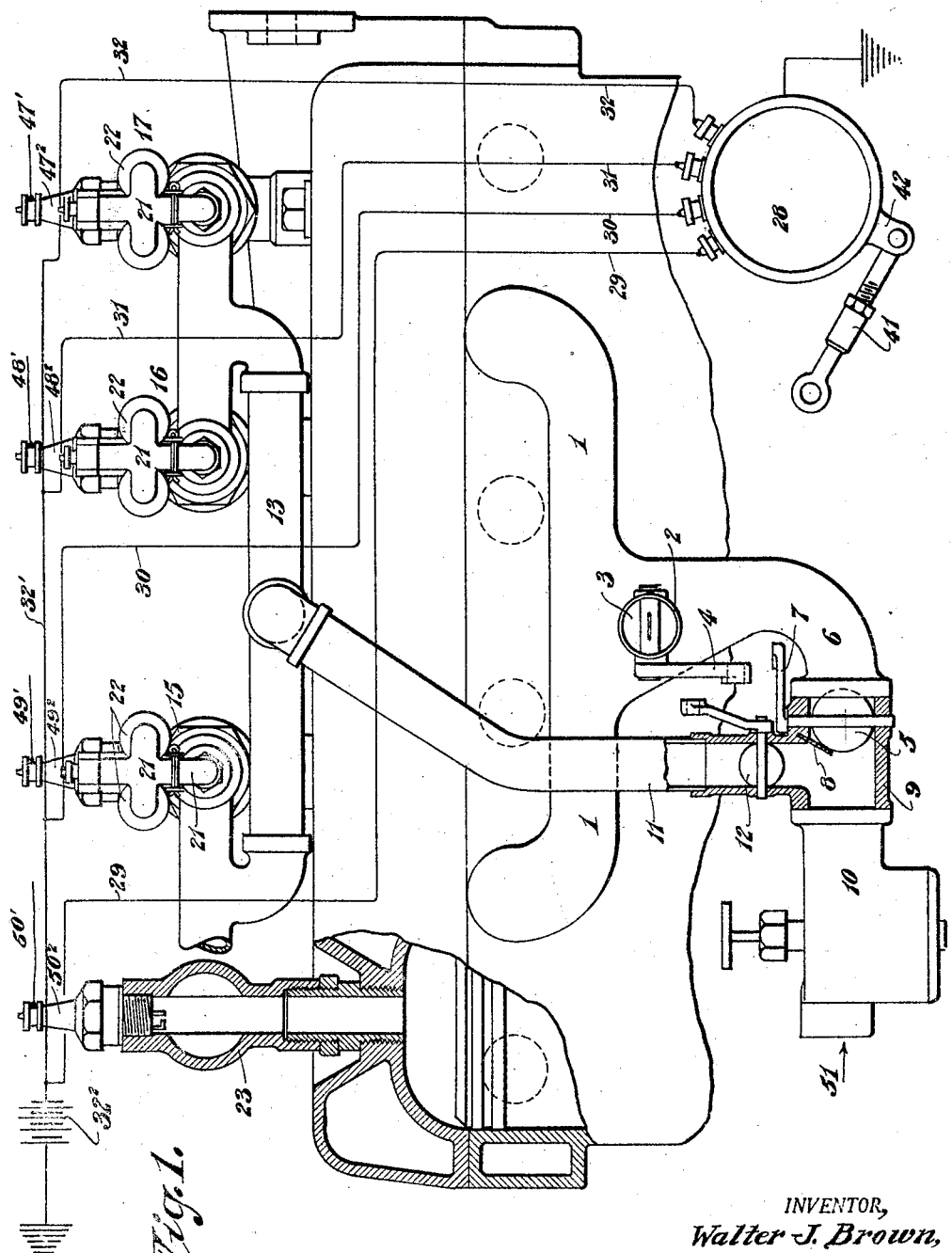

Patented Mar. 24, 1925.

1,531,069

UNITED STATES PATENT OFFICE.

WALTER J. BROWN, OF SPRINGFIELD, MASSACHUSETTS.

INTERNAL-COMBUSTION ENGINE.

Application filed January 7, 1922. Serial No. 527,614.

*To all whom it may concern:*

Be it known that I, WALTER J. BROWN, a citizen of the United States of America, residing at Springfield, county of Hampden, and Commonwealth of Massachusetts, have invented certain new and useful Improvements in Internal-Combustion Engines, of which the following is a specification.

This invention relates to improvements in internal combustion engines in which electromagnetic devices are provided for admitting the combustible or vaporous charge to the upper or explosion end of each of the cylinders, and also, means are provided for causing the charge to be forced or driven into close contact with each of the spark plugs, whereby positive means are provided for igniting the charge at each compression stroke of the piston. In internal combustion engines as now constructed often times the mixture is such that it causes the machine to misfire resulting in uneven action of the rotating or moving parts of the engine.

An object therefore of the present invention is to provide means for admitting air to the clearance space, or if desired air which contains a suitable percentage of gasoline vapor, and in addition admitting a vaporous charge of gasoline into an extension of the clearance space in which the spark plug is located, whereby the plug is surrounded with a rich mixture of gasoline vapor, when the piston returns on its compression stroke the charge or layer of air forces or compresses the charge of gasoline vapor into close contact with the spark plug thus always insuring that the charge will be fired.

An object of the invention is to provide means for closing the electric circuits to the various spark plugs also to the electromagnetic devices for admitting the vaporous charge into the upper end of the cylinders.

A further object is to provide means for regulating or varying the mixture both as to the quantity and quality by means of suitably arranged valves in the fuel supply pipe and in the manifold.

Other objects and nature of the invention will appear in the body of the specification and will be specifically pointed out in the claim.

Referring to the drawings:

Fig. 1 is a side elevational view showing the arrangement of the electromagnetically controlled fuel inlet valves, a portion of one of the cylinders being shown in section with the hollow extension attached or connected to the head thereof for forcing the charge by the air in the clearance space upward toward the spark plug which is located in this extension, also, showing the carburetor, and an auxiliary air inlet valve in the manifold and two gas valves in the pipes which conveys the fuel charge to the interior of the cylinder and the arrangement of the make and break device which closes the circuits to the electromagnetically operated valves.

Fig. 2 is an enlarged detail sectional view of the upper end of one of the cylinders with the electromagnetically operated fuel inlet valve shown in section, the pipe connections for conveying the vaporous charge to the interior of the cylinders and the exhaust pipe connections.

Fig. 3 is a detail view of the make and break device for controlling the circuits to the electromagnetically operated valves and is a section on the line 3—3 of Fig. 5.

Fig. 4 is a detail view of the make and break device which controls the circuits to the spark plugs and is a section on the line 4—4 of Fig. 5.

Fig. 5 is an assembly view of the structure shown in Figs. 3 and 4 and,

Fig. 6 is a detail view of the distributor part of the timer.

Referring to the drawings in detail:

1 designates the usual manifold for conveying the vaporous fuel charge to each of the cylinders. Located in this manifold is an air inlet pipe 2 and a valve 3, therein. 4 designates a crank arm for controlling the valve 3, a side elevational view of which is shown in Fig. 2. 5 indicates a valve or fuel controlling member at the lower end of the pipe 6 that is operated by the crank arm 7. 8 is a deflecting plate located in front of the valve 5 to deflect or turn a portion of the incoming charge up the pipe 11. Connected to the lower end of pipe 6 is a coupling member 9 to which the carburetor 10 is attached. Extending upward from the coupling member is a pipe 11 having a valve 12 therein. This pipe leads to a second pipe indicated at 13 that extends horizontally above the upper ends of all of the cylinders of the engine.

The reference numbers 14, 15, 16, and 17 designate four electromagnetically operated devices which controls a corresponding number of inlet valves one of which is indicated at 18, in Fig. 2. This expansive valve is normally closed by means of the valve spring 19 which surrounds the valve stem 20. 21 indicates an armature which is controlled by the electromagnet 22 of each of the electrically operated devices 14, 15, 16, and 17. It is evident that when the armature 21 is operated the fuel valve 18 will be opened. This valve opens into an upwardly extending firing chamber or pipe 23 which is connected to the removable cylinder head 24 by means of the union 25 and ring 26. 27 designates a spark plug of any suitable construction that is located at the upper end of the firing chamber 23 and as shown is arranged close to or adjacent the fuel inlet valve 18. 28 designates a distributor or make and break device for closing the circuits to the electromagnetic devices 14, 15, 16, and 17 by means of the wires 29, 30, 31, and 32. 32' is the connection with the battery $32^2$ connected therein. Located within the distributor device 28 are the contact plates 33, 34, 35, and 36 which are electrically connected to the terminals 37, 38, 39, and 40 as indicated by the wires 33', 34', 35', and 36'. 41 represents a turnbuckle device attached to the projections 42 whereby the current distributor device 28 may be placed in its correct position or adjusted. 43 designates a rotatable contact device which is mounted for rotation within the casing 44. It is provided with a contact piece 45, which is designed to engage the contact segments 33, 34, 35, and 36 in succession whereby the circuit is closed to the electromagnetically operated valve devices 14, 15, 16, and 17. The contact brush 46 engages the contact plates 47, 48, 49, and 50.

It will be seen therefore that when the distributor part 43 is rotated the contact piece 45 will successively close the circuits to the electromagnetically operated devices 14, 15, 16, and 17 and that further rotation of the part 43 and the contact piece 46 will in succession close the circuits 47', 48', 49', and 50' to the spark plugs $47^2$, $48^2$, $49^2$, and $50^2$, of the different cylinders, it being understood that the charge is first admitted through each of the fuel inlet valves at 18 into the firing chamber 23 before the electric circuit is closed to the corresponding spark plugs.

The operation of the device may be described as follows:

Assume the air as entering the carburetor at the point 51. It is drawn through the same by the suction of the pistons. A portion of the charge from the carburetor passes past the valves 5 and 12; the part that passes the valve 5 is drawn into the manifold 1 to the upper ends of each of cylinders. The mixture that passes into the manifold may be varied by means of the auxiliary air inlet valve 3 which admits air into the manifold. The part that passes by the valve 12 flows up the pipe 11 into distributor pipe 13 which leads to each of the firing chambers in which the valves 18 are located. At the proper point in the cycle of operations the current distributor member 43 by means of its contact member 45 closes the circuit to one of the electromagnetically operated devices 14, 15, 16, and 17. The vaporous charge is then admitted into the upper end of the firing chamber 23. When the inlet valve 18 is opened the mixture that is drawn into the upper end of each of the cylinders is forced upward or confined in the upper end of the firing chamber 23 as indicated by the arrow 52 which has the effect of compressing or placing the charge under pressure and forcing it into close contact and around the terminals of the spark plugs in the upper ends of each of the firing chamber 23. The member 43, by means of its contact 46 now closes the circuits 47', 48', 49', and 50' in succession to the spark plugs, whereby the charge is fired. When the charge is fired it passes down the firing chamber 23 and serves to move the piston on its downward or power stroke.

It will readily be seen that the charge can be drawn in through the pipe 11 and air past the valve 3 in the manifold 1, filling the compression space in the cylinder with air leaving a charge of gas in the firing chamber 23, which on the upward stroke forces the charge of gas in the firing chamber 23 toward the spark plug, producing a layer of air and gas with a slight mixture when the charge is ignited by the spark plug 27 and reacts on the air in the cylinder forcing the piston downward.

It will readily be seen by this arrangement a full compression of a small amount of gas is obtained. This will allow the full thermal efficiency of the gas that is admitted to the firing chamber 23. It will also be seen that the charge which passes through the auxiliary air inlet can be diluted and increased to a full charge of gas, if desired.

It will be seen that by means of this structure the inlet valve 18 permits the charge to enter the firing chamber 23 adjacent to spark plug 27 and that as the charge is compressed by the piston on its upward stroke $a$ the mixture of gas and air is compressed towards the spark plug and there is very little liability of the charge not being fired.

The regular or usual inlet valve is indicated at $51^a$.

The usual exhaust valves are understood to be used and the exhaust outlets are indicated in dotted lines in Fig. 1, as shown.

It is to be understood that I do not confine myself to the use of gasoline as alcohol may be used.

What I claim is:

In an internal combustion engine, the combination, of a carburetor therefor, said carburetor being connected to the manifold pipe, an auxiliary air inlet in the manifold for admitting air to the clearance space, a valve in the inlet, a valve between the carburetor and the auxiliary air inlet, a second pipe connected to the manifold pipe, a valve in this pipe, the location of the valve elements in the pipes being such that the vaporous charge coming from the carburetor is divided, a part of the same passing through the manifold pipe and the remainder through the other pipe, and means for conducting the parts of the charge from said pipes to the clearance space at the upper end of the cylinder whereby the charge that enters the cylinder through the manifold pipe will be forced into contact with the charge which passes into the cylinder through the pipe that is connected to the manifold, and means for firing the charge, said auxiliary air inlet serving to dilute the charge in the clearance space.

WALTER J. BROWN.